(12) United States Patent
Shveidel et al.

(10) Patent No.: US 11,797,525 B2
(45) Date of Patent: Oct. 24, 2023

(54) ONE PATH METADATA PAGE RECONSTRUCTION WITH NO DYNAMICAL MEMORY ALLOCATION FOR DELTA-LOG BASED STORAGE

(71) Applicant: EMC IP Holding Company LLC, Hopkinton, MA (US)

(72) Inventors: Vladimir Shveidel, Pardes-Hana (IL); Ami Sabo, Netanya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 126 days.

(21) Appl. No.: 17/355,548

(22) Filed: Jun. 23, 2021

(65) Prior Publication Data

US 2022/0414086 A1 Dec. 29, 2022

(51) Int. Cl.
*G06F 16/23* (2019.01)

(52) U.S. Cl.
CPC ...... *G06F 16/2379* (2019.01); *G06F 16/2358* (2019.01)

(58) Field of Classification Search
CPC .......................... G06F 16/2379; G06F 16/2358
See application file for complete search history.

(56) References Cited

U.S. PATENT DOCUMENTS

| | | | |
|---|---|---|---|
| 9,594,803 B2 | 3/2017 | Welton et al. | |
| 9,720,921 B1* | 8/2017 | Bhattacharyya | G06F 9/5027 |
| 10,891,195 B2 | 1/2021 | Chen | |
| 11,042,296 B1 | 6/2021 | Shveidel et al. | |
| 11,137,929 B2 | 10/2021 | Chen et al. | |
| 11,157,177 B2 | 10/2021 | Gazit et al. | |
| 2003/0158863 A1* | 8/2003 | Haskin | G06F 16/10 |
| 2016/0077746 A1* | 3/2016 | Muth | G06F 3/061 711/159 |
| 2018/0285403 A1* | 10/2018 | Legler | G06F 16/2474 |
| 2021/0064486 A1* | 3/2021 | Rana | G06F 11/1484 |
| 2021/0216531 A1 | 7/2021 | Shveidel et al. | |
| 2022/0158989 A1* | 5/2022 | Leung | H04L 63/0815 |

* cited by examiner

*Primary Examiner* — Tamara T Kyle
*Assistant Examiner* — Lahcen Ennaji
(74) *Attorney, Agent, or Firm* — BainwoodHuang

(57) ABSTRACT

Techniques for reconstructing or building metadata pages in storage nodes that have a delta-log based architecture. The techniques include walking "up" an ancestor chain of a metadata page, detecting the most recent delta update for a metadata entry of the metadata page, writing the most recent delta update to a location of the metadata entry in the metadata page, setting a bitmap entry corresponding to the location of the metadata entry in the metadata page, detecting a less recent delta update for the metadata entry of the metadata page, and, having previously set the bitmap entry corresponding to the location of the metadata entry in the metadata page, avoiding writing the less recent delta update to the location of the metadata entry in the metadata page. In this way, the need to save in memory the entire ancestor chain of the metadata page can be eliminated.

14 Claims, 8 Drawing Sheets

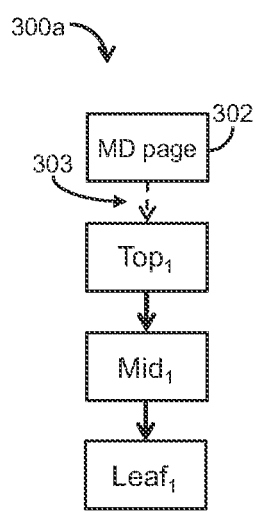
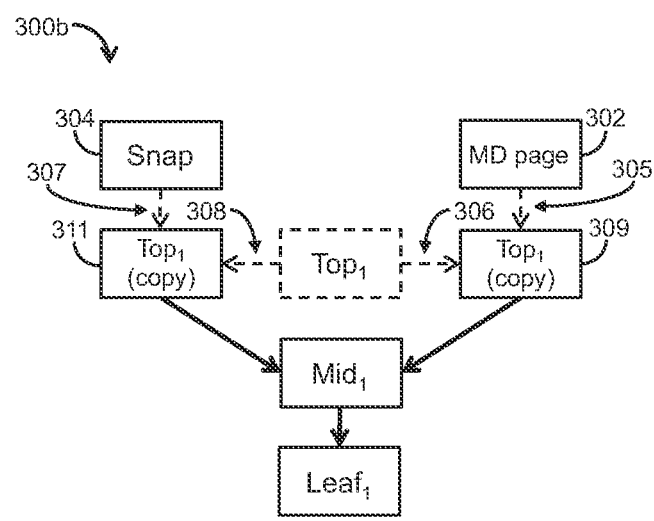
Fig. 3a
Fig. 3b

```
Read Page_X into PageXContent[i]
byte NonOverWriteBitMap[i]

Child = Page_X
Parent = Parent(Child)

// build accumulated delta updates from Page_X to Root in ancestor chain
While Parent:
    Read delta update values assigned to Child in reverse order (from most recent to
    less recent):
        For each delta update value read in reverse order:
            For each MD_entry i in content of Child that is being overwritten by the delta
            update value:
                If bit I in NonOverWriteBitMap is not set:
                    PageXContent[i] = value assigned to MD_entry i by the delta update
                    value
                    Set bit I in NonOverWriteBitMap
    Child = Parent
    Parent = Parent(Child)

// set unchanged MD entries of Page_X
For i=0 to Number_of_MD_entries
    If bit I is not set in NonOverWriteBitMap:
        PageXContent[i] = RootContent[i]
```

*Fig. 5*

ONE PATH METADATA PAGE RECONSTRUCTION WITH NO DYNAMICAL MEMORY ALLOCATION FOR DELTA-LOG BASED STORAGE

BACKGROUND

Clustered storage systems (also referred to herein as "storage cluster(s)") employ various techniques to protect and/or distribute data and metadata. In response to receipt of a write input/output (IO) request from a client computer, a storage processor (also referred to herein as a "storage node(s)") of a storage cluster writes an update to a delta value (also referred to herein as a "delta update(s)") associated with a metadata page to a metadata delta-log. Having written the delta update to the metadata delta-log, the storage node sends an acknowledgement to the client computer that issued the write IO request. Later, the storage node de-stages delta updates from the metadata delta-log, applying all relevant delta updates to the metadata page and storing the metadata page to a storage array.

SUMMARY

A storage node of a storage cluster can be configured with a delta-log based architecture that includes a metadata delta-log implemented in volatile memory. The metadata delta-log can include a first set of logical data containers and a second set of logical data containers, in which each logical data container (also referred to herein as a "bucket(s)") is associated with a metadata page. The storage node can write delta updates of one or more metadata pages to the metadata delta-log, filling one or more of the first set of buckets with the delta updates. The first set of buckets that receives the delta updates can be designated as the "active" set, while the second set of buckets can be designated as the "de-staging" set. The storage node can also write copies of the delta updates to a journal implemented in persistent memory. Once one or more of the active set of buckets have been filled, the "active" and "de-staging" designations of the first and second sets can be switched, and additional delta updates of metadata pages can be written to the buckets in the set now designated as "active." Further, the delta updates that were previously written to the buckets in the set now designated as "de-staging" can be de-staged from the metadata delta-log and stored with the associated metadata pages to a storage array.

In the delta-log based architecture, each bucket of the metadata delta-log can be configured as a tree structure (e.g., binary tree or "b-tree") having multiple levels of nodes. Further, at least some metadata pages can correspond to child metadata pages that have dependency relationships with parent metadata pages. While de-staging delta updates of a metadata page from the metadata delta-log, a walk "up" an ancestor chain of nodes in the tree structure can be performed (e.g., child-to-parent, parent-to-grandparent, grandparent-to-great grandparent, and so on, up to the oldest ancestor, i.e., the "root node"). Having located the root node of the metadata page, a walk "down" the same ancestor chain of nodes can be performed (e.g., oldest ancestor-to-great grandparent, great grandparent-to-grandparent, grandparent-to-parent, parent-to-child), and all relevant delta updates detected during the walk down the ancestor chain of nodes can be applied to the metadata page.

The foregoing technique for de-staging delta updates of a metadata page from a metadata delta-log can be problematic, however, because it can require the entire ancestor chain of a metadata page to be saved in memory to perform the walk down the ancestor chain. Further, because parent-child dependency relationships between metadata pages can be recursive, the corresponding ancestor chain can be very large. To accommodate such a large ancestor chain in memory, enough memory can be pre-allocated to handle the largest predicted ancestor chain. However, such an approach is undesirable because it can result in wasted memory space. Alternatively, static memory allocation can be employed for the majority of ancestor chains, while dynamical memory allocation can be employed for the larger ancestor chains. However, such an alternative approach is also undesirable, particularly in real-time systems in which all system resources are generally pre-allocated before the start of each system transaction.

Techniques are disclosed herein for reconstructing or building metadata pages in storage nodes that have a delta-log based architecture. The disclosed techniques can be employed to apply all relevant delta updates of a metadata page determined from an ancestor chain of the metadata page, without having to save the entire ancestor chain in memory. The disclosed techniques can include writing delta updates of a metadata page to a metadata delta-log, which can have a tree structure with multiple levels of nodes. The top level of the tree structure can include the oldest ancestor (also referred to herein as the "root node") of the metadata page, which can include a plurality of corresponding locations for a plurality of metadata entries, respectively. The disclosed techniques can further include traversing or walking the ancestor chain upward toward the root node of the metadata page. The disclosed techniques can further include, while walking up the ancestor chain of the metadata page, detecting one or more delta updates for each respective metadata entry in at least some of the corresponding locations of the metadata page. The delta updates can include a new (or most recent) delta update for the respective metadata entry in the ancestor chain, as well as one or more older (or less recent) delta updates for the respective metadata entry higher up the ancestor chain. The disclosed techniques can further include, in response to detecting the most recent delta update for the respective metadata entry, writing the most recent delta update to a corresponding location of the metadata page, and setting a corresponding entry of a bitmap for the metadata page. The disclosed techniques can further include, in response to detecting a less recent delta update for the respective metadata entry, determining that the corresponding bitmap entry has previously been set, and, in response thereto, avoiding writing the less recent delta update to the corresponding location of the metadata page. The disclosed techniques can further include, having walked up the ancestor chain of the metadata page, determining whether any entries of the bitmap have not been set for one or more remaining metadata entries of the metadata page. The disclosed techniques can further include, for each bitmap entry that has not been set for a remaining metadata entry, obtaining, from the root node of the metadata page, an unchanged delta value of the remaining metadata entry, and writing the unchanged delta value to a corresponding location in the metadata page.

By walking "up" an ancestor chain of a metadata page, detecting the most recent delta update for a metadata entry of the metadata page, writing the most recent delta update to a location of the metadata entry in the metadata page, setting a bitmap entry corresponding to the location of the metadata entry in the metadata page, detecting a less recent delta update for the metadata entry of the metadata page, and, having previously set the bitmap entry corresponding to the location of the metadata entry in the metadata page, avoiding writing the less recent delta update to the location of the metadata entry in the metadata page, the need to save in memory the entire ancestor chain of the metadata page can be eliminated.

In certain embodiments, a method of building a metadata page in a storage node having a delta-log based architecture includes traversing an ancestor chain of a metadata page upward toward a root node of the metadata page. The method further includes, while traversing the ancestor chain of the metadata page upward toward the root node of the metadata page, detecting a most recent delta update for a metadata entry of the metadata page. The method further includes writing the most recent delta update for the metadata entry to an entry location of the metadata page and setting a bitmap entry corresponding to the entry location of the metadata page. The method further includes, while further traversing the ancestor chain of the metadata page upward toward the root node of the metadata page, detecting a less recent delta update for the metadata entry of the metadata page. The method further includes, having previously set the bitmap entry corresponding to the entry location of the metadata page, avoiding writing the less recent delta update to the entry location of the metadata page.

In certain arrangements, the method further includes, while traversing the ancestor chain of the metadata page upward toward the root node of the metadata page, avoiding storing the ancestor chain in memory.

In certain arrangements, the method further includes, having traversed the ancestor chain of the metadata page, determining that at least one bitmap entry corresponding to at least one remaining entry location of the metadata page has not been set.

In certain arrangements, the method further includes, for each bitmap entry corresponding to a remaining entry location of the metadata page that has not been set, obtaining an unchanged delta value from the root node of the metadata page.

In certain arrangements, the method further includes writing the unchanged delta value to the remaining entry location of the metadata page.

In certain embodiments, a system for building a metadata page in a storage node having a delta-log based architecture includes a memory, and processing circuitry configured to execute program instructions out of the memory to traverse an ancestor chain of a metadata page upward toward a root node of the metadata page. The processing circuitry is further configured to execute the program instructions out of the memory, while traversing the ancestor chain of the metadata page upward toward the root node of the metadata page, to detect a most recent delta update for a metadata entry of the metadata page. The processing circuitry is further configured to execute the program instructions out of the memory to write the most recent delta update for the metadata entry to an entry location of the metadata page, and to set a bitmap entry corresponding to the entry location of the metadata page. The processing circuitry is further configured to execute the program instructions out of the memory, while further traversing the ancestor chain of the metadata page upward toward the root node of the metadata page, to detect a less recent delta update for the metadata entry of the metadata page. The processing circuitry is further configured to execute the program instructions out of the memory, having previously set the bitmap entry corresponding to the entry location of the metadata page, to avoid writing the less recent delta update to the entry location of the metadata page.

In certain arrangements, the processing circuitry is further configured to execute the program instructions out of the memory, while traversing the ancestor chain of the metadata page upward toward the root node of the metadata page, to avoid storing the ancestor chain in the memory.

In certain arrangements, the processing circuitry is further configured to execute the program instructions out of the memory, having traversed the ancestor chain of the metadata page, to determine that at least one bitmap entry corresponding to at least one remaining entry location of the metadata page has not been set.

In certain arrangements, the processing circuitry is further configured to execute the program instructions out of the memory, for each bitmap entry corresponding to a remaining entry location of the metadata page that has not been set, to obtain an unchanged delta value from the root node of the metadata page.

In certain arrangements, the processing circuitry is further configured to execute the program instructions out of the memory to write the unchanged delta value to the remaining entry location of the metadata page.

In certain arrangements, the metadata page is a writable metadata page.

In certain arrangements, the metadata page has one or more parent-child dependency relationships with one or more parent metadata pages.

In certain arrangements, the metadata page has a parent-child dependency relationship with a snapshot of the metadata page.

In certain arrangements, the metadata page corresponds to a snapshot of another metadata page.

In certain arrangements, the snapshot is a writable snapshot.

In certain embodiments, a computer program product includes a set of non-transitory, computer-readable media having instructions that, when executed by processing circuitry, cause the processing circuitry to perform a method including traversing an ancestor chain of a metadata page upward toward a root node of the metadata page. The method further includes, while traversing the ancestor chain of the metadata page upward toward the root node of the metadata page, detecting a most recent delta update for a metadata entry of the metadata page. The method further includes writing the most recent delta update for the metadata entry to an entry location of the metadata page and setting a bitmap entry corresponding to the entry location of the metadata page. The method further includes, while further traversing the ancestor chain of the metadata page upward toward the root node of the metadata page, detecting a less recent delta update for the metadata entry of the metadata page. The method further includes, having previously set the bitmap entry corresponding to the entry location of the metadata page, avoiding writing the less recent delta update to the entry location of the metadata page.

Other features, functions, and aspects of the present disclosure will be evident from the Detailed Description that follows.

BRIEF DESCRIPTION OF THE DRAWINGS

The foregoing and other objects, features and advantages will be apparent from the following description of particular embodiments of the present disclosure, as illustrated in the accompanying drawings, in which like reference characters refer to the same parts throughout the different views.

FIGS. 3a-3c are block diagrams of exemplary mapping layer configurations for a metadata page and a snapshot of the metadata page, in which a parent-child dependency relationship exists between the metadata page and the snapshot;

FIG. 5 illustrates exemplary pseudocode for reconstructing or building metadata pages in storage nodes that have a delta-log based architecture.

DETAILED DESCRIPTION

Techniques are disclosed herein for reconstructing or building metadata pages in storage nodes that have a delta-log based architecture. The disclosed techniques can include walking "up" an ancestor chain of a metadata page, detecting the most recent delta update for a metadata entry of the metadata page, writing the most recent delta update to a location of the metadata entry in the metadata page, setting a bitmap entry corresponding to the location of the metadata entry in the metadata page, detecting a less recent delta update for the metadata entry of the metadata page, and, having previously set the bitmap entry corresponding to the location of the metadata entry in the metadata page, avoiding writing the less recent delta update to the location of the metadata entry in the metadata page. In this way, the need to save in memory the entire ancestor chain of the metadata page can be eliminated.

Figure 1:
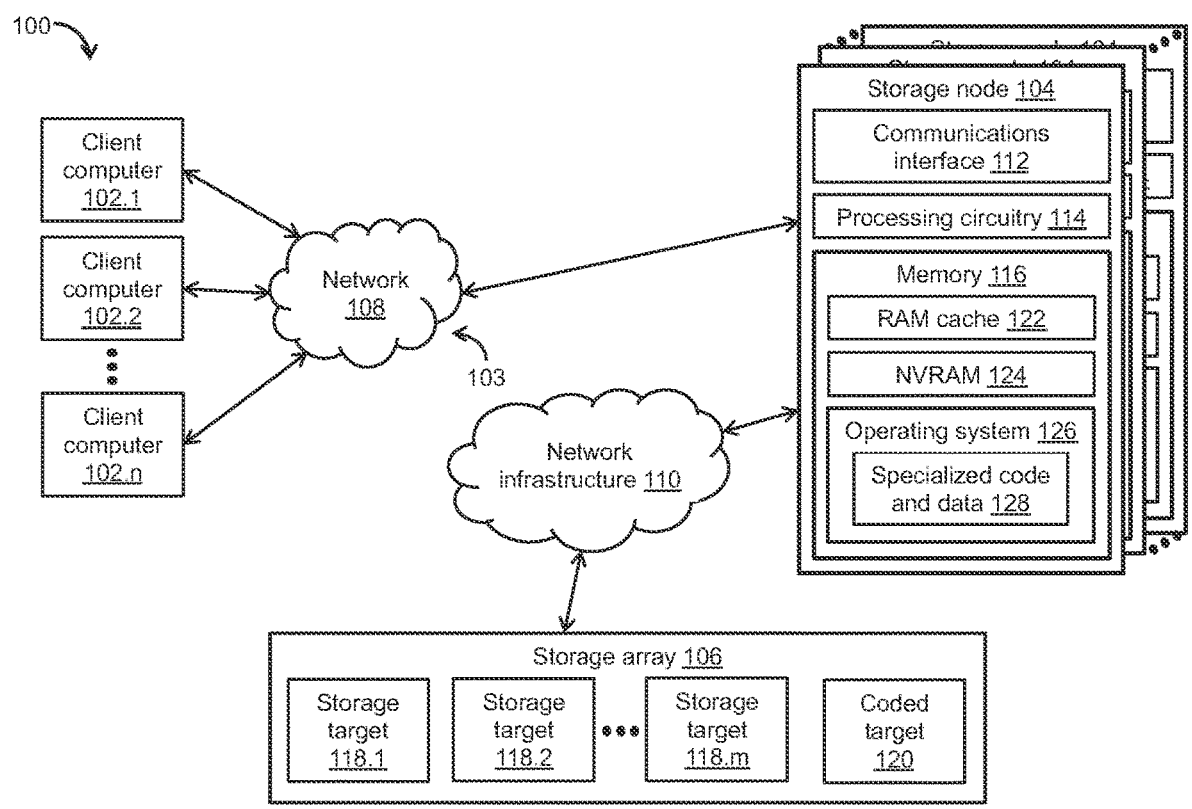
FIG. 1 is a block diagram of an exemplary storage cluster environment, in which techniques can be practiced for reconstructing or building metadata pages in storage nodes that have a delta-log based architecture.

FIG. 1 depicts an illustrative embodiment of a storage cluster environment 100, in which techniques can be practiced for reconstructing or building metadata pages in storage nodes that have a delta-log based architecture. As shown in FIG. 1, the storage cluster environment 100 can include a plurality of client computers 102.1, 102.2, . . . , 102.n, a plurality of storage processors ("storage nodes") including a storage node 104, a storage array 106, and a communications medium 103 that includes at least one network 108. The plurality of client computers 102.1, . . . , 102.n can be configured to provide, over the network 108, storage input/output (IO) requests (e.g., small computer system interface (SCSI) commands, network file system (NFS) commands) to the storage node 104. Such storage IO requests (e.g., write IO requests, read IO requests) can direct the storage node 104 to write and/or read data pages, data blocks, data files, or any other suitable data objects to/from logical units (LUs), volumes (VOLs), file systems, and/or any other suitable storage targets, such as storage targets 118.1, 118.2, . . . , 118.m maintained in the storage array 106.

The communications medium 103 can be configured to interconnect the plurality of client computers 102.1, . . . , 102.n with the storage node 104 to enable them to communicate and exchange data and control signaling. As shown in FIG. 1, the communications medium 103 can be illustrated as a "cloud" to represent different network topologies, such as storage area network (SAN) topologies, network attached storage (NAS) topologies, local area network (LAN) topologies, metropolitan area network (MAN) topologies, wide area network (WAN) topologies, and so on. As such, the communications medium 103 can include copper-based data communications devices and cabling, fiber optic devices and cabling, wireless devices, and so on, or any suitable combination thereof.

The storage node 104 can be connected directly to the storage array 106 or via a network infrastructure 110, which can include an Ethernet network, an InfiniBand network, a fiber channel network, and/or any other suitable network. As shown in FIG. 1, the storage node 104 can include a communications interface 112, processing circuitry 114, and a memory 116. The communications interface 112 can include one or more of an Ethernet interface, an InfiniBand interface, a fiber channel interface, and/or any other suitable communications interface. The communications interface 112 can further include SCSI target adapters, network interface adapters, and/or any other suitable adapters for converting electronic, optical, and/or wireless signals received over the network 108 to a form suitable for use by the processing circuitry 114.

The memory 116 can include volatile memory, such as a random-access memory (RAM) cache 122 or any other suitable volatile memory, as well as persistent memory, such as a nonvolatile random-access memory (NVRAM) 124 or any other suitable persistent memory. The memory 116 can store a variety of software constructs realized in the form of specialized code and data 128 (e.g., program instructions) that can be executed by the processing circuitry 114 to carry out the techniques and/or methods disclosed herein. The memory 116 can further include an operating system 126, such as a Linux operating system (OS), Unix OS, Windows OS, or any other suitable operating system. The processing circuitry 114 can include one or more physical storage processors and/or storage engines configured to execute the specialized code and data 128 as program instructions out of the memory 116, process storage IO requests (e.g., write IO requests, read IO requests) issued by the respective client computers 102.1, . . . , 102.n, and/or store data and/or metadata to the storage array 106 in the storage cluster environment 100, which can be a clustered RAID environment.

As shown in FIG. 1, the storage array 106 can include a coded target 120, which can be configured to store coded data for use in regenerating lost or corrupted data on one or more of the storage targets 118.1, 118.2, . . . , 118.m. In some embodiments, the coded target 120 can be stored to a hard disk drive (HDD) configured to store parity data in a RAID array. Alternatively, or in addition, the storage targets 118.1, 118.2, . . . , 118.m and the coded target 120 can be stored to one or more HDDs, solid state drives (SSDs), flash devices, and/or any other suitable storage device(s). It is noted that the storage node 104 can include a keyboard, a mouse, and/or any other suitable IO module or device, an uninterruptable power supply (UPS), and/or any other suitable storage node modules, devices, and/or components.

In the context of the processing circuitry 114 being implemented using one or more storage processors executing the specialized code and data 128, a computer program product can be configured to deliver all or a portion of the specialized code and data 128 to the respective storage processor(s). Such a computer program product can include one or more non-transient computer-readable storage media, such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective storage processor(s), the various techniques and/or methods disclosed herein.

Figure 2:
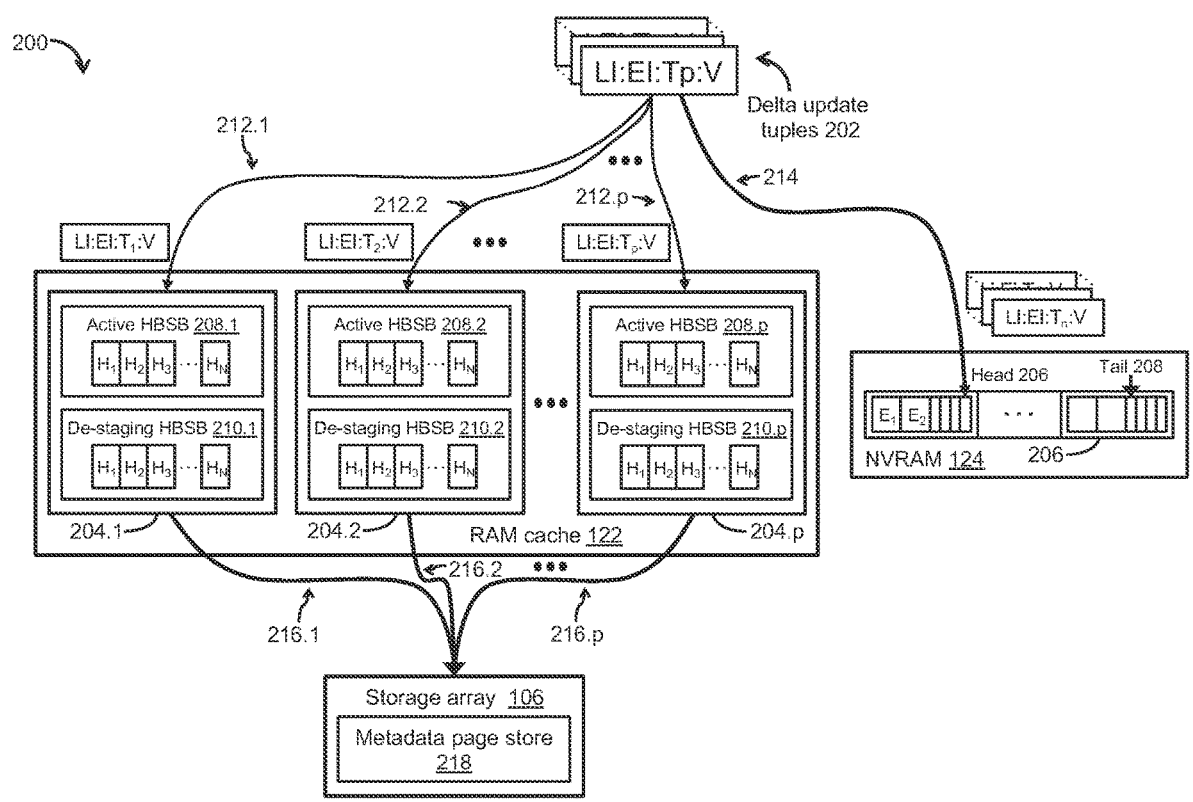
FIG. 2 is a block diagram of an exemplary delta-log based architecture of a storage node in the storage cluster environment of FIG. 1.

FIG. 2 depicts a delta-log based architecture 200 of the storage node 104 in the storage cluster environment 100 of FIG. 1. As shown in FIG. 2, the delta-log based architecture 200 can include volatile memory components having multiple instances of metadata delta-logs 204.1, 204.2, . . . , 204.$p$ (also referred to herein collectively as the "metadata delta-log 204"), which can be implemented in the RAM cache 122. The metadata delta-log 204.1 can include a first ("active") set 208.1 of logical data containers ("buckets") $H_1$, $H_2$, $H_3$, . . . , $H_N$, in which "N" is any suitable positive integer, and a second ("de-staging") set 210.1 of logical data containers ("buckets") $H_1$, $H_2$, $H_3$, . . . , $H_N$. Likewise, the metadata delta-log 204.2 can include a first ("active") set 208.2 of logical data containers ("buckets") $H_1$, $H_2$, $H_3$, . . . , $H_N$ and a second ("de-staging") set 210.2 of logical data containers ("buckets") $H_1$, $H_2$, $H_3$, . . . , $H_N$. In general, the metadata delta-log 204.$p$, in which "p" is any suitable positive integer, can include a first ("active") set 208.$p$ of logical data containers ("buckets") $H_1$, $H_2$, $H_3$, . . . , $H_N$ and a second ("de-staging") set 210.$p$ of logical data containers ("buckets") $H_1$, $H_2$, $H_3$, . . . , $H_N$. Each of the first and second sets of buckets $H_1$, $H_2$, $H_3$, . . . , $H_N$ included in the metadata delta-log 204 can be configured to store updates to delta values (also referred to herein as "delta updates") associated with metadata pages. Further, each of the buckets $H_1$, $H_2$, $H_3$, . . . , $H_N$ can be configured as a tree structure (e.g., binary tree or "b-tree") with multiple levels of nodes (e.g., top, mid, leaf) or any other suitable data structure.

As described herein, the processing circuitry 114 of the storage node 104 can execute the specialized code and data 128 as program instructions out of the memory 116, as well as process storage IO requests (e.g., write IO requests, read IO requests) issued by the respective client computers 102.1, . . . , 102.$n$ to write/read data and/or metadata to/from the storage array 106. Such metadata can correspond to delta updates, which can be de-staged from the metadata delta-log 204 and stored on an associated metadata page on the storage array 106. Each such delta update can specify a pending change to a data value at the leaf level of the tree structure implemented by one of the buckets $H_1$, $H_2$, $H_3$, . . . , $H_N$.

In some embodiments, the storage node 104 can convert a plurality of delta updates of a metadata page into a plurality of delta update tuples 202, respectively. As shown in FIG. 2, each of the plurality of delta update tuples 202 can include several tuple parameters, such as a logical index "LI" of a metadata page, an entry index "EI" that refers to an offset within the metadata page, a delta type "$T_p$" that defines the type "p" of the delta update entry, and a value "V" of the delta update entry. The storage node 104 can also write delta update tuples for particular delta types $T_1$, $T_2$, . . . , $T_p$ to the metadata delta-logs 204.1, . . . , 204.$p$, respectively, in the RAM cache 122. For example, the storage node 104 can write delta update tuples LI:EI:$T_1$:V to the metadata delta-log 204.1 (as illustrated by a path 212.1), as well as write delta update tuples LI:EI:$T_1$:V to the metadata delta-log 204.2 (as illustrated by a path 212.2). In general, the storage node 104 can write delta update tuples LI:EI:$T_p$:V to the metadata delta-log 204.$p$ (as illustrated by a path 212.$p$). The storage node 104 can subsequently de-stage the delta updates of the metadata page from the metadata delta-log 204 to a metadata page store 218 (as illustrated by paths 216.1, 216.2, . . . , 216.$p$) implemented in the storage array 106.

In some embodiments, the storage node 104 can determine target buckets $H_1$, $H_2$, $H_3$, . . . , $H_N$ for respective delta update tuples LI:EI:$T_1$:V in the first set 208.1 of buckets of the metadata delta-log 204.1 based on a hash function of the logical index, LI, of a metadata page. Likewise, the storage node 104 can determine target buckets $H_1$, $H_2$, $H_3$, . . . , $H_N$ for respective delta update tuples LI:EI:$T_1$:V in the first set 208.2 of buckets of the metadata delta-log 204.2 based on the hash function of the logical index, LI, of the metadata page. In general, the storage node 104 can determine target buckets $H_1$, $H_2$, $H_3$, . . . , $H_N$ for respective delta update tuples LI:EI:$T_p$:V in the first set 208.$p$ of buckets of the metadata delta-log 204.$p$ based on the hash function of the logical index, LI, of the metadata page. In such embodiments, the various buckets $H_1$, . . . , $H_N$ of the metadata delta-log 204 can be referred to as hash-based sorted buckets (HBSBs).

As shown in FIG. 2, the storage node 104 can write copies of the delta update tuples LI:EI:$T_p$:V for the particular delta types $T_1$, $T_2$, . . . , $T_p$ to a journal 206 (as illustrated by a path 214) included in the NVRAM 124. In the event of a disaster, data loss, and/or data corruption, the storage node 104 can replay the journal 206 to apply the delta updates written thereto to the metadata delta-log 204 to recover it to a consistent state. In some embodiments, the journal 206 can be configured as a ring buffer with a head 206 and a tail 208. The storage node 104 can write each respective tuple LI:EI:$T_p$:V for a particular delta type $T_1$, $T_2$, . . . , $T_p$ to the head 206 of the ring buffer, and subsequently release allocated space for the respective tuple LI:EI:$T_p$:V from the tail 208 of the ring buffer. As such, the journal 206 can store the respective delta update tuples Li:Ei:$T_p$:V in time order (e.g., from oldest to newest).

As described herein, each of the buckets (e.g., HBSBs) $H_1$, $H_2$, $H_3$, . . . , $H_N$ of the metadata delta-log 204 can be configured as a tree structure (e.g., binary tree or "b-tree") with multiple levels of nodes (e.g., top, mid, leaf). Further, delta updates associated with metadata pages can specify pending changes to data values at the leaf levels of tree structures implemented by the respective HBSBs $H_1$, $H_2$, $H_3$, . . . , $H_N$. It is noted that at least some of the metadata pages can correspond to child metadata pages, each of which can have a dependency relationship with a parent metadata page. Accordingly, while de-staging delta updates associated with a metadata page from one of the HBSBs $H_1$, $H_2$, $H_3$, . . . , $H_N$, a walk "up" an ancestor chain of the metadata page can be performed, e.g., child-to-parent, parent-to-grandparent, grandparent-to-great grandparent, and so on, up to the oldest ancestor, i.e., the "root node" of the metadata page. Such a root node of a metadata page can be characterized by not having a dependency relationship with a parent metadata page.

FIGS. 3$a$, 3$b$, and 3$c$ depict mapping layer configurations 300$a$, 300$b$, and 300$c$, respectively, for a metadata (MD) page 302 and a snapshot ("snap") 304 of the MD page 302. The mapping layer configurations 300$a$, 300$b$, 300$c$ are depicted herein to provide an illustrative example of how parent-child dependency relationships can be established between metadata pages, such as the MD page 302 and the snap 304. In this example, it is assumed that at least the snap 304 is implemented as a "writable" metadata page. In other words, one or more new (or most recent) delta updates of the snap 304 can be received and stored or logged into the metadata delta-log 204, which can further store or log one or more older (or less recent) delta updates of the snap 304 that have not been de-staged.

FIG. 3a depicts the mapping layer configuration 300a for the MD page 302 before the creation of the snap 304. As shown in FIG. 3a, the mapping layer configuration 300a can have a tree structure with a top level that includes a "Top$_1$" node, a mid-level that includes a "Mid$_1$" node, and a leaf level that includes a "Leaf$_1$" node. It is noted that each of the top level and the mid-level of the mapping layer configuration 300a can include a set of block pointers that point to the adjacent level of the tree structure (i.e., top level-to-mid-level, mid-level-to-leaf level). It is further noted that the Top$_1$ node is uniquely associated with the MD page 302, as indicated by a dashed arrow 303.

FIG. 3b depicts the mapping layer configuration 300b, which includes a mapping layer configuration for each of the MD page 302 and the snap 304. As shown in FIG. 3b, once the snap 304 of the MD page 302 is created, the mapping layer configuration for the MD page 302 can be depicted with reference to a "Top$_1$" (copy) node 309 in the top level, the Mid$_1$ node in the mid-level, and the Leaf$_1$ node in the leaf level. As further shown in FIG. 3b, the mapping layer configuration for the snap 304 can be depicted with reference to a "Top$_1$" (copy) node 311 in the top level, the Mid$_1$ node in the mid-level, and the Leaf$_1$ node in the leaf level. It is noted that each of the Top$_1$ (copy) node 309 and the Top$_1$ (copy) node 311 corresponds to a copy of the Top$_1$ node, as indicated by dashed arrows 306, 308. It is further noted that the Top$_1$ (copy) node 309 is uniquely associated with the MD page 302, as indicated by a dashed arrow 305, and the Top$_1$ (copy) node 311 is uniquely associated with the snap 304, as indicated by a dashed arrow 307.

Figure 3C:
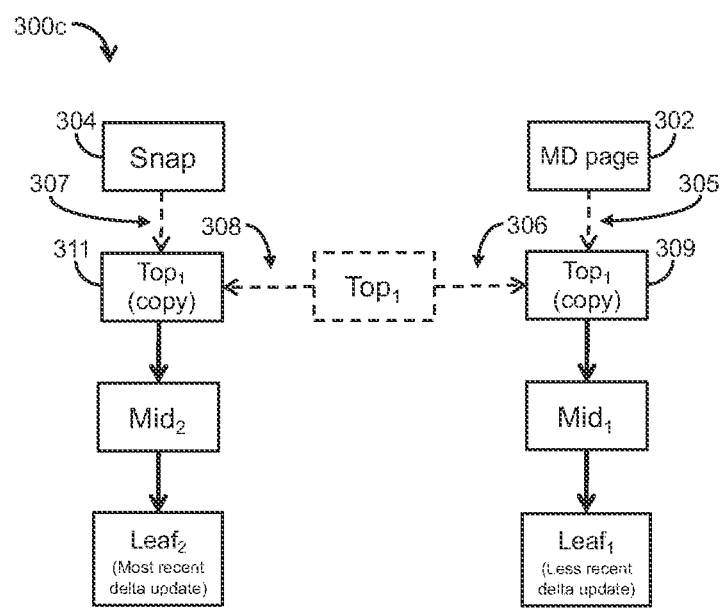

FIG. 3c depicts the mapping layer configuration 300c, which includes a mapping layer configuration for each of the MD page 302 and the snap 304 following receipt of a new (or most recent) delta update for the snap 304. As shown in FIG. 3c, the mapping layer configuration for the MD page 302 is again depicted with reference to the Top$_1$ (copy) node 309 in the top level, the Mid$_1$ node in the mid-level, and the Leaf$_1$ node in the leaf level. However, the mapping layer configuration for the snap 304 is now depicted with reference to the Top$_1$ (copy) node 311 in the top level, a "Mid$_2$" node in the mid-level, and a "Leaf$_2$" node in the leaf level.

Once the new (or most recent) delta update is received for the snap 304, a parent-child dependency relationship is created between the MD page 302 and the snap 304. It is noted that the actual metadata of the new (or most recent) delta update for the snap 304 is maintained at the Leaf$_2$ node, while the actual metadata of the older (or less recent) delta update is maintained at the Leaf$_1$ node.

During operation, the storage node 104 (see FIG. 1) can be configured to reconstruct or build a metadata page by applying all relevant delta updates to the metadata page determined from an ancestor chain of the metadata page, without having to save the entire ancestor chain in the memory 116. The storage node 104 can be configured to traverse or walk the ancestor chain upward toward the root node of the metadata page. While walking up the ancestor chain of the metadata page, the storage node 104 can be configured to detect one or more delta updates for each respective metadata entry in at least some corresponding locations of the metadata page. The delta updates can include the most recent delta update for the respective metadata entry, as well as one or more less recent delta updates for the respective metadata entry. In response to detecting the most recent delta update for the respective metadata entry, the storage node 104 can be configured to write the most recent delta update to a corresponding location of the metadata page, and set a corresponding entry of a bitmap (e.g., a bitmap 402; see FIGS. 4a-4e) for the metadata page. In response to detecting a less recent delta update for the respective metadata entry, the storage node 104 can determine that the corresponding bitmap entry has previously been set, and, in response thereto, avoiding writing the less recent delta update to the corresponding location of the MD page 302. Having walked up the ancestor chain of the metadata page, the storage node 104 can determine whether any entries of the bitmap 402 have not been set for one or more remaining metadata entries of the metadata page. For each bitmap entry that has not been set for a remaining metadata entry of the metadata page, the storage node 104 can be configured to obtain, from the oldest ancestor (i.e., the "root node") of the metadata page, an unchanged delta value of the remaining metadata entry, and to write the unchanged delta value to a corresponding location of the metadata page.

By walking "up" the ancestor chain of the metadata page, detecting the most recent delta update for a metadata entry of the metadata page, writing the most recent delta update to a location of the metadata entry in the metadata page, setting a bitmap entry corresponding to the location of the metadata entry in the metadata page, detecting a less recent delta update for the metadata entry of the metadata page, and, having previously set the bitmap entry corresponding to the location of the metadata entry in the metadata page, avoiding writing the less recent delta update to the location of the metadata entry in the metadata page, the need to save in memory the entire ancestor chain of the metadata page can be eliminated.

The disclosed techniques for reconstructing or building metadata pages in storage nodes that have a delta-log based architecture will be further understood with reference to the following illustrative example and FIGS. 2 and 4a-4e. In this example, it is assumed that a plurality of new (or most recent) delta updates of a metadata (MD) page 404 (see FIGS. 4a-4e) have been stored or logged into the metadata delta-log 204 (see FIG. 2), which further stores or logs a plurality of older (or less recent) delta updates of the MD page 404. Further in this example, it is assumed that multiple parent-child dependency relationships have been established between the MD page 404 and several other MD pages and/or snaps, such that the parent-child dependency relationships define an ancestor chain of the MD page 404.

Figure 4A:
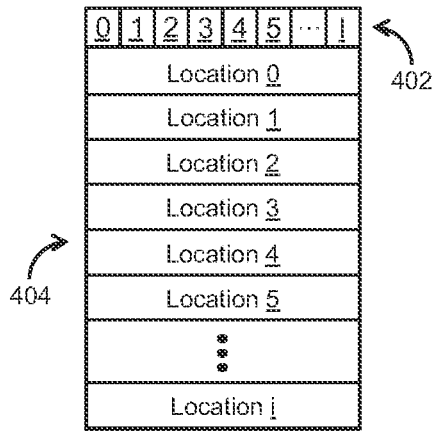
FIGS. 4a-4e are diagrams of an exemplary metadata page including a plurality of corresponding locations for a plurality of metadata entries, respectively, and an exemplary bitmap for the metadata page.

FIG. 4a depicts the MD page 404 and the bitmap 402 (also referred to herein as the "non-overwrite bitmap") for the MD page 404. As shown in FIG. 4a, the MD page 404 includes a plurality of corresponding locations 0, 1, . . . , i for a plurality of MD entries, respectively. As further shown in FIG. 4a, the non-overwrite bitmap 402 includes a plurality of corresponding locations 0, 1, . . . , I for a plurality of bitmap entries, respectively. For example, the MD page 404 can have a size of 4 kilobytes (Kb) or any other suitable size and include about 640 (i=0, 1, . . . , 639) MD entries or any other suitable number of MD entries. Further, the non-overwrite bitmap 402 can have a size of about 80 bytes (640 bits) or any other suitable size and include about 640 (I=0, 1, . . . , 639) bitmap entries or any other suitable number of bitmap entries.

The MD page 404 of FIG. 4a can be reconstructed or built by walking "up" the ancestor chain of the MD page 404 and detecting delta updates (from most recent to less recent) for each MD entry 0, . . . , i in at least some of the corresponding locations 0, . . . , i of the MD page 404. In this example, a delta update is detected for MD entry 1, which corresponds to location 1 of the MD page 404. In response to detecting the delta update for MD entry 1, a determination is made as to whether a corresponding bitmap entry 1 of the non-overwrite bitmap 402 has been set (i.e., whether location 1 of the non-overwrite bitmap 402 stores a "1" bit). Further in this example, it is determined that the corresponding bitmap entry 1 of the non-overwrite bitmap 402 has not been set, thereby indicating that a delta update has not previously been written to the corresponding location 1 for MD entry 1. The detected delta update is therefore regarded as a new (or most recent) delta update for MD entry 1. Accordingly, the most recent delta update for MD entry 1 is written to the corresponding location 1 of the MD page 404, and the corresponding bitmap entry 1 of the non-overwrite bitmap 402 is set (i.e., a "1" bit is written to location 1 of the non-overwrite bitmap 402).

Figure 4B:
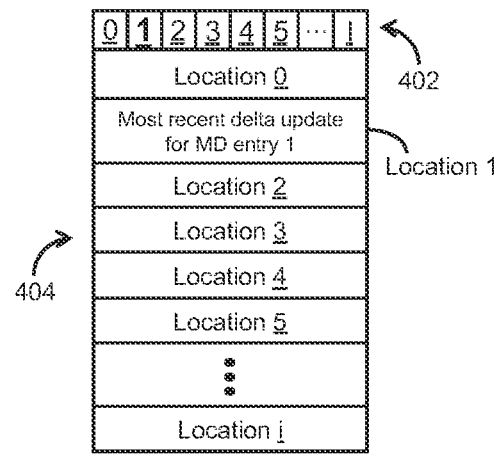

FIG. 4b depicts the MD page 404 after the delta value of the most recent update for MD entry 1 has been written to the corresponding location 1 of the MD page 404 and the corresponding bitmap entry 1 of the non-overwrite bitmap 402 has been set. As shown in FIG. 4b, location "1" of the non-overwrite bitmap 402 is illustrated in bold font style to indicate that a delta value has been written to the corresponding location 1 of the MD page 404.

In this example, while continuing to walk up the ancestor chain of the MD page 404, a delta update is detected for MD entry 4, which corresponds to location 4 of the MD page 404. In response to detecting the delta update for MD entry 4, a determination is made as to whether a corresponding bitmap entry 4 of the non-overwrite bitmap 402 has been set (i.e., whether location 4 of the non-overwrite bitmap 402 stores a "1" bit). Further in this example, it is determined that the corresponding bitmap entry 4 of the non-overwrite bitmap 402 has not been set, thereby indicating that a delta update has not previously been written to the corresponding location 4 for MD entry 4. The detected delta update is therefore regarded as a new (or most recent) delta update for MD entry 4. Accordingly, the most recent delta update for MD entry 4 is written to the corresponding location 4 of the MD page 404, and the corresponding bitmap entry 4 of the non-overwrite bitmap 402 is set (i.e., a "1" bit is written to location 4 of the non-overwrite bitmap 402).

Figure 4C:
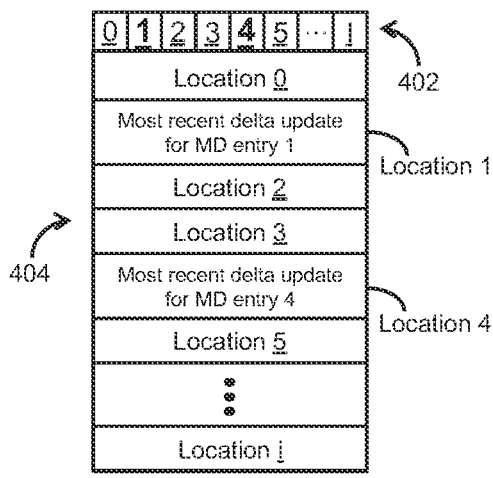

FIG. 4c depicts the MD page 404 after the delta value of the most recent update for MD entry 4 has been written to the corresponding location 4 of the MD page 404 and the corresponding bitmap entry 4 of the non-overwrite bitmap 402 has been set. As shown in FIG. 4b, location "4" of the non-overwrite bitmap 402 is illustrated in bold font style to indicate that a delta value has been written to the corresponding location 4 of the MD page 404.

In this example, while continuing to walk up the ancestor chain of the MD page 404, a second delta update is detected for MD entry 4 of the MD page 404. In response to detecting the second delta update for MD entry 4, a determination is made as to whether the corresponding bitmap entry 4 of the non-overwrite bitmap 402 has been set (i.e., whether location 4 of the non-overwrite bitmap 402 stores a "1" bit). In response to determining that the corresponding bitmap entry 4 of the non-overwrite bitmap 402 has been set, the second delta update is regarded as an older (or less recent) delta update for MD entry 4. Accordingly, the less recent delta update for MD entry 4 is not written to the corresponding location 4 of the MD page 404. In this way, unwanted overwriting of the most recent delta update for MD entry 4 of the MD page 404 can be avoided. It is noted that such unwanted overwriting of the most recent delta updates for any of the MD entries 0, . . . , i of the MD page 404 can be avoided in a similar fashion.

In this example, while continuing to walk up the ancestor chain of the MD page 404, a delta update is detected for MD entry 5, which corresponds to location 5 of the MD page 404. In response to detecting the delta update for MD entry 5, a determination is made as to whether a corresponding bitmap entry 5 of the non-overwrite bitmap 402 has been set (i.e., whether location 5 of the non-overwrite bitmap 402 stores a "1" bit). Further in this example, it is determined that the corresponding bitmap entry 5 of the non-overwrite bitmap 402 has not been set, thereby indicating that a delta update has not previously been written to the corresponding location 5 for MD entry 5. The detected delta update is therefore regarded as a new (or most recent) delta update for MD entry 5. Accordingly, the most recent delta update for MD entry 5 is written to the corresponding location 5 of the MD page 404, and the corresponding bitmap entry 5 of the non-overwrite bitmap 402 is set (i.e., a "1" bit is written to location 5 of the non-overwrite bitmap 402).

Figure 4D:
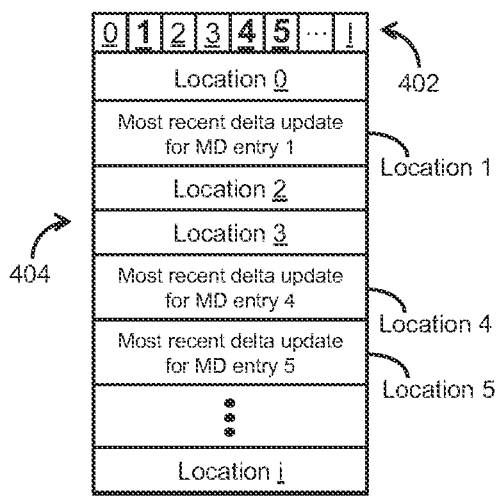

FIG. 4d depicts the MD page 404 after the delta value of the most recent update for MD entry 5 has been written to the corresponding location 5 of the MD page 404 and the corresponding bitmap entry 5 of the non-overwrite bitmap 402 has been set. As shown in FIG. 4d, location "5" of the non-overwrite bitmap 402 is illustrated in bold font style to indicate that a delta update has been written to the corresponding location 5 of the MD page 404.

In this example, the walk up the ancestor chain of the MD page 404 continues until the oldest ancestor (i.e., the root node) of the MD page 404 is reached. Once the root node of the MD page 404 has been reached, it can be assured that all most recent delta updates for at least some of the plurality of MD entries 0, . . . , i (such as the most recent delta updates for MD entries 1, 4, and 5) have been detected and written to at least some of the corresponding locations 0, . . . , i (such as the corresponding locations 1, 4, and 5) of the MD page 404. Further in this example, it is assumed that delta values of the remaining updates for MD entries 0, 2, 3, 6, . . . , i of the MD page 404 have not been changed from their original delta values stored at the root node of the MD page 404. Accordingly, the unchanged delta updates for MD entries 0, 2, 3, 6, . . . , i are applied to the corresponding locations 0, 2, 3, 6, . . . , i of the MD page 404 by examining the bitmap entries 0, 1, . . . , I of the non-overwrite bitmap 402, and, for those bitmap entries 0, 1, . . . , I that have not been set (i.e., for the bitmap entries 0, 2, 3, 6, . . . , I whose corresponding locations 0, 2, 3, 6, . . . , I store "0" bits), writing the delta values of the unchanged updates stored at the root node to the corresponding locations 0, 2, 3, 6, . . . , i of the MD page 404.

Figure 4E:
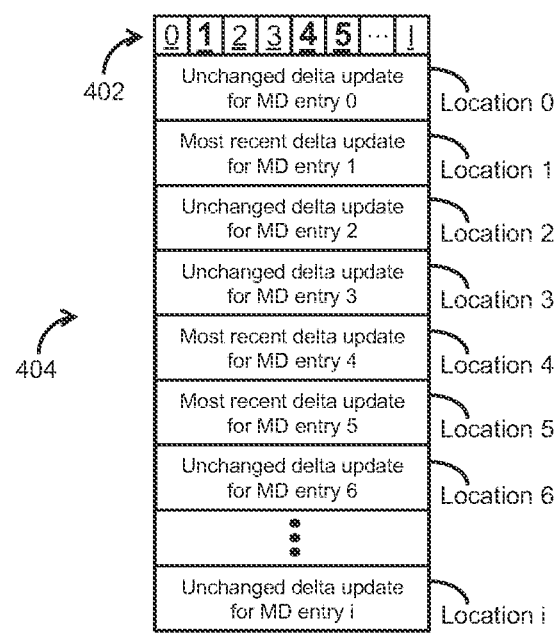

FIG. 4e depicts the reconstructed or built MD page 404 after the delta values of the unchanged updates 0, 2, 3, 6, . . . , i have been written to the corresponding locations 0, 2, 3, 6, . . . , i of the MD page 404. As shown in FIG. 4e, the MD page 404 includes the most recent delta updates for MD entries 1, 4, and 5 written to the corresponding locations 1, 4, and 5, respectively, as well as the unchanged delta updates for MD entries 0, 2, 3, 6, . . . , i written to the corresponding locations 0, 2, 3, 6, . . . , i, respectively.

FIG. 5 depicts pseudocode 500 that can be executed for implementing the illustrative example described above. As shown in FIG. 5, the pseudocode 500 provides an implementation of a process for reconstructing or building a MD page (also referred to herein as "Page_X"; see FIG. 5), which can have multiple parent-child dependency relationships established with several other MD pages and/or snaps, as well as a root node (also referred to herein as the "Root"; see FIG. 5) in an ancestor chain defined by the parent-child dependency relationships. As further shown in FIG. 5, the process for reconstructing or building the MD page (Page_X) employs a non-overwrite bitmap (also referred to herein as the "NonOverWriteBitMap"; see FIG. 5) to avoid overwriting the most recent delta updates for any of the MD entries 0, . . . , i of the MD page (Page_X). It is noted that the pseudocode 500 depicted in FIG. 5 provides just one example implementation of a process for reconstructing or building a MD page in a storage node with a delta-log based architecture, and that alternative implementations of the process can be employed in other embodiments.

Figure 6:
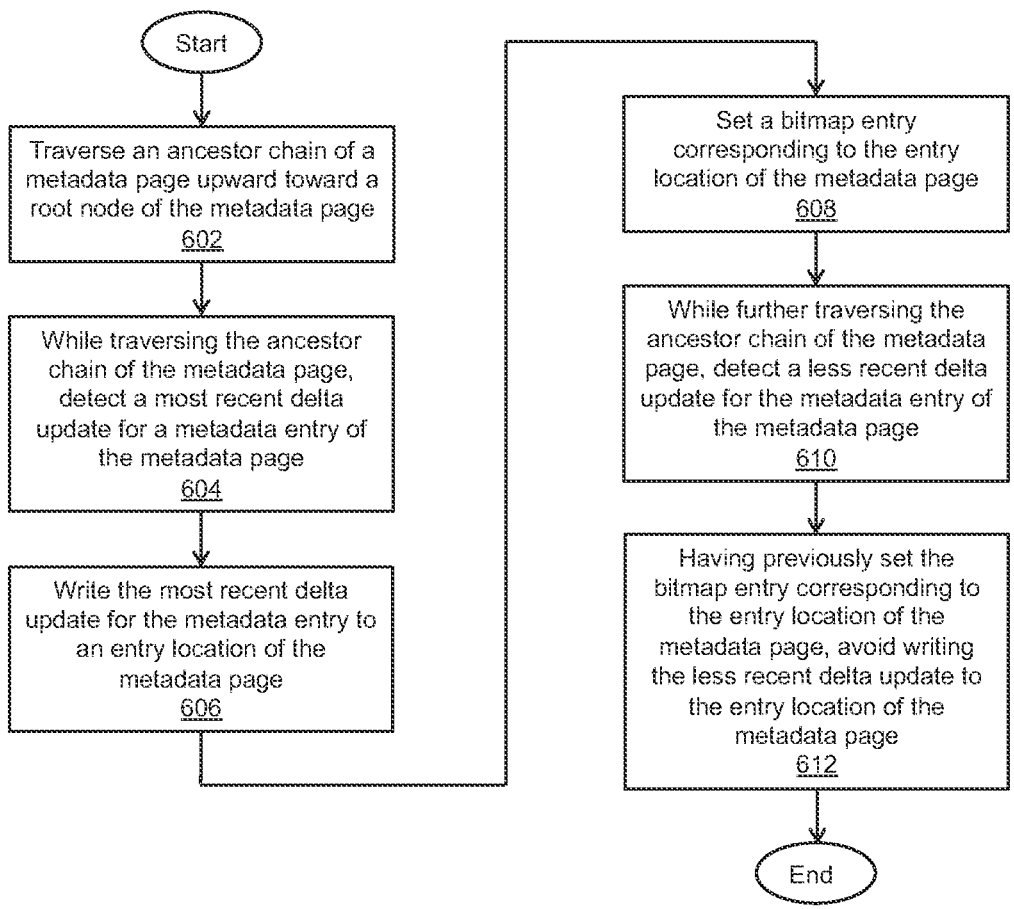
FIG. 6 is a flow diagram of an exemplary method of reconstructing or building metadata pages in storage nodes that have a delta-log based architecture.

A method of reconstructing or building metadata pages in storage nodes that have a delta-log based architecture is described below with reference to FIG. 6. As depicted in block 602, an ancestor chain of a metadata page is traversed upward toward a root node of the metadata page. As depicted in block 604, while traversing the ancestor chain of the metadata page, a most recent delta update is detected for a metadata entry of the metadata page. As depicted in block 606, the most recent delta update for the metadata entry is written to an entry location of the metadata page. As depicted in block 608, a bitmap entry corresponding to the entry location of the metadata page is set. As depicted in block 610, while further traversing the ancestor chain of the metadata page, a less recent delta update is detected for the metadata entry of the metadata page. As depicted in block 612, having previously set the bitmap entry corresponding to the entry location of the metadata page, the writing of the less recent delta update to the entry location of the metadata page is avoided.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a storage system used for block-based, file-based, or object storage. Storage arrays can include, for example, dedicated storage hardware containing HDDs, SSDs, and/or all-flash drives. A storage entity may be a filesystem, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of building a metadata page in a storage node having a delta-log based architecture, comprising:
    traversing an ancestor chain of a metadata page upward toward a root node of the metadata page;
    while traversing the ancestor chain of the metadata page upward toward the root node of the metadata page, detecting a most recent delta update for a metadata entry of the metadata page;
    writing the most recent delta update for the metadata entry to an entry location of the metadata page;
    setting a bitmap entry corresponding to the entry location of the metadata page;
    while further traversing the ancestor chain of the metadata page upward toward the root node of the metadata page, detecting a less recent delta update for the metadata entry of the metadata page; and
    having previously set the bitmap entry corresponding to the entry location of the metadata page, avoiding writing the less recent delta update to the entry location of the metadata page;
    having traversed the ancestor chain of the metadata page, determining that at least one bitmap entry corresponding to at least one remaining entry location of the metadata page has not been set; and
    for each bitmap entry corresponding to a remaining entry location of the metadata page that has not been set, obtaining an unchanged delta value from the root node of the metadata page.

2. The method of claim 1 further comprising:
while traversing the ancestor chain of the metadata page upward toward the root node of the metadata page, avoiding storing the ancestor chain in memory.

3. The method of claim 1 further comprising:
writing the unchanged delta value to the remaining entry location of the metadata page.

4. A system for building a metadata page in a storage node having a delta-log based architecture, comprising:
a memory; and
processing circuitry configured to execute program instructions out of the memory to:
traverse an ancestor chain of a metadata page upward toward a root node of the metadata page;
while traversing the ancestor chain of the metadata page upward toward the root node of the metadata page, detect a most recent delta update for a metadata entry of the metadata page;
write the most recent delta update for the metadata entry to an entry location of the metadata page;
set a bitmap entry corresponding to the entry location of the metadata page;
while further traversing the ancestor chain of the metadata page upward toward the root node of the metadata page, detect a less recent delta update for the metadata entry of the metadata page;
having previously set the bitmap entry corresponding to the entry location of the metadata page, avoid writing the less recent delta update to the entry location of the metadata page;
having traversed the ancestor chain of the metadata page, to determine that at least one bitmap entry corresponding to at least one remaining entry location of the metadata page has not been set; and
for each bitmap entry corresponding to a remaining entry location of the metadata page that has not been set, to obtain an unchanged delta value from the root node of the metadata page.

5. The system of claim 4 wherein the processing circuitry is further configured to execute the program instructions out of the memory, while traversing the ancestor chain of the metadata page upward toward the root node of the metadata page, to avoid storing the ancestor chain in the memory.

6. The system of claim 4 wherein the processing circuitry is further configured to execute the program instructions out of the memory to write the unchanged delta value to the remaining entry location of the metadata page.

7. The system of claim 4 wherein the metadata page is a writable metadata page.

8. The system of claim 4 wherein the metadata page has one or more parent-child dependency relationships with one or more parent metadata pages.

9. The system of claim 4 wherein the metadata page has a parent-child dependency relationship with a snapshot of the metadata page.

10. The system of claim 4 wherein the metadata page corresponds to a snapshot of another metadata page.

11. The system of claim 10 wherein the snapshot is a writable snapshot.

12. A computer program product including a set of non-transitory, computer-readable media having instructions that, when executed by processing circuitry, cause the processing circuitry to perform a method comprising:
traversing an ancestor chain of a metadata page upward toward a root node of the metadata page;
while traversing the ancestor chain of the metadata page upward toward the root node of the metadata page, detecting a most recent delta update for a metadata entry of the metadata page;
writing the most recent delta update for the metadata entry to an entry location of the metadata page;
setting a bitmap entry corresponding to the entry location of the metadata page;
while further traversing the ancestor chain of the metadata page upward toward the root node of the metadata page, detecting a less recent delta update for the metadata entry of the metadata page; and
having previously set the bitmap entry corresponding to the entry location of the metadata page, avoiding writing the less recent delta update to the entry location of the metadata page;
having traversed the ancestor chain of the metadata page, determining that at least one bitmap entry corresponding to at least one remaining entry location of the metadata page has not been set; and
for each bitmap entry corresponding to a remaining entry location of the metadata page that has not been set, obtaining an unchanged delta value from the root node of the metadata page.

13. The computer program product of claim 12 wherein the method further comprises:
while traversing the ancestor chain of the metadata page upward toward the root node of the metadata page, avoiding storing the ancestor chain in memory.

14. The computer program product of claim 12 wherein the method further comprises:
writing the unchanged delta value to the remaining entry location of the metadata page.

* * * * *